(12) United States Patent
Malaczynski et al.

(10) Patent No.: US 9,046,048 B2
(45) Date of Patent: Jun. 2, 2015

(54) METHOD OF FUEL QUALITY DETERMINATION

(71) Applicant: DELPHI TECHNOLOGIES HOLDING, S.arl, Bascharage (LU)

(72) Inventors: Gerard Wladyslaw Malaczynski, Bloomfield Hills, MI (US); Robert J.A. Van Der Poel, Schweich (LU)

(73) Assignee: DELPHI INTERNATIONAL OPERATIONS LUXEMBOURG, S.A.R.L., Luxembourg (LU)

( * ) Notice: Subject to any disclaimer, the term of this patent is extended or adjusted under 35 U.S.C. 154(b) by 337 days.

(21) Appl. No.: 13/648,383

(22) Filed: Oct. 10, 2012

(65) Prior Publication Data

US 2013/0275021 A1   Oct. 17, 2013

(30) Foreign Application Priority Data

Oct. 10, 2011   (EP) .................................... 11184524

(51) Int. Cl.
| | |
|---|---|
| *F02D 41/30* | (2006.01) |
| *F02D 45/00* | (2006.01) |
| *F02D 19/06* | (2006.01) |
| *F02D 41/00* | (2006.01) |
| *F02D 41/08* | (2006.01) |
| *F02D 41/14* | (2006.01) |
| *F02B 3/06* | (2006.01) |
| *F02D 41/28* | (2006.01) |

(52) U.S. Cl.
CPC ................ *F02D 45/00* (2013.01); *F02D 41/08* (2013.01); *F02D 41/1497* (2013.01); *F02B 3/06* (2013.01); *F02D 19/0636* (2013.01); *F02D 19/0649* (2013.01); *F02D 41/0025* (2013.01); *F02D 2041/288* (2013.01); *F02D 2200/0612* (2013.01); *F02D 2200/101* (2013.01); *F02D 2250/14* (2013.01); *Y02T 10/36* (2013.01)

(58) Field of Classification Search
CPC ............ F02D 19/0636; F02D 41/0025; F02D 2041/288; F02D 2200/0611; F02D 45/00
USPC .................. 701/103, 104, 110; 123/1 A, 436; 73/114.04, 114.25
See application file for complete search history.

(56) References Cited

U.S. PATENT DOCUMENTS

| | | | | |
|---|---|---|---|---|
| 6,021,758 | A   * | 2/2000 | Carey et al. .................... | 123/436 |
| 6,481,273 | B2 * | 11/2002 | Maloney ..................... | 73/114.72 |
| 6,668,812 | B2 * | 12/2003 | Javaherian ..................... | 123/673 |
| 7,027,910 | B1 * | 4/2006 | Javaherian et al. ........... | 701/111 |
| 2010/0191447 | A1 | 7/2010 | Gourves | |

FOREIGN PATENT DOCUMENTS

| | | |
|---|---|---|
| DE | 102006026380 | 12/2007 |
| DE | 102008010107 | 6/2009 |

OTHER PUBLICATIONS

European Search Report dated Mar. 23, 2012.

* cited by examiner

*Primary Examiner* — Hai Huynh
(74) *Attorney, Agent, or Firm* — Mark H. Suoboda

(57) ABSTRACT

A method of determining fuel quality in an internal combustion engine comprises the steps of: a) sampling a signal representative of the revolution speed of said engine during a sampling window, thereby obtaining an array of samples; and b) computing a Fourier component corresponding to a predetermined index in the frequency domain and determining a fuel quality indicator therefrom. The fuel quality indicator is representative of a magnitude of the Fourier component of this predetermined index.

16 Claims, 2 Drawing Sheets

METHOD OF FUEL QUALITY DETERMINATION

FIELD OF THE INVENTION

The present invention generally relates to fuel quality detection and more particularly to a method of fuel quality determination.

BACKGROUND OF THE INVENTION

Cetane number (or CN) is a measurement of the combustion quality of diesel fuel during compression ignition. It is a significant expression of diesel fuel quality among a number of other measurements that determine overall diesel fuel quality.

Cetane number is actually a measure of a fuel's ignition delay; the time period between the start of injection and start of combustion (ignition) of the fuel. In a particular diesel engine, higher cetane fuels will have shorter ignition delay periods than lower cetane fuels. In other words, higher cetane fuels can be more easily ignited, also implying that ignition may take place at comparatively lower pressure and temperature, which has a direct impact on the crankshaft angular position at combustion.

The fuel quality may greatly vary around the world. As it is well known, the quality of diesel fuel may even differ at regional level, as e.g. within the USA. Unfortunately the variation of fuel quality also has an effect on driving comfort and engine emissions, and it is thus desirable to take this into account.

JP 2006016994 proposes a method of detecting fuel quality, where the Cetane Number is determined based on a pressure profile in the combustion chamber. Such method requires a dedicated pressure sensor, and thus implies modification of the engine design and additional costs.

DE102008010107 discloses a method of fuel classification, which involves determining a complex ignition frequency component of revolution speed spectrum of the engine. A phase corresponding to this complex component is used as indicator to assign the fuel to one of the different fuel classes.

The phase information corresponding to a complex component of the engine rotation frequency domain has also been used for misfire detection.

SUMMARY OF THE INVENTION

The present invention results from findings by the present inventors that the known phase-based fuel and misfire detection in engine rotation frequency domain does not always permit a reliable detection. For a reliable practical implementation of such known methods, wide range engine calibrations would be required.

These shortcomings are overcome by the method of fuel quality determination for an internal combustion engine according to the present invention, which comprises the steps of:
  sampling a signal representative of the revolution speed of the engine, thereby obtaining an array of samples; and
  computing a Fourier component corresponding to a predetermined frequency index (preferably of natural frequency) from the array of samples and determining a fuel quality indicator therefrom.

According to an important aspect of the present method, the fuel quality indicator is representative of a magnitude of said Fourier component of said predetermined index.

Hence, while the known approaches of combustion analysis in frequency domain have typically used the phase information of the complex component of engine speed spectrum, typically because it is considered that the fuel quality impacts the combustion timing and thus is conventionally considered by the skilled person as a matter of crankshaft angle.

However, the present inventors have surprisingly observed that the magnitude (amplitude) of the complex component of a given index proves to be a more efficient indicator (metric) of the fuel quality. The so-determined magnitude of the Fourier component of selected index may thus readily be used as fuel quality indicator.

The present inventors have indeed found that engine instability induced by substandard fuel, at any constant (preferably low) engine speed correlates very well with a specific index of DFT (Digital Fourier Transformation) representing natural frequency of the engine. This specific index is preferably conditioned by the number of firings per engine combustion cycle and the definition (size/width) of the sampling window. This feature, reflecting the engine misbalance at engine speed close to idling (or other low speed load) allows the instantaneous diagnostic of the fuel quality represented—in case of IC engines—by the cetane number.

The sampling step may typically involve taking angular timestamps of the crankshaft, e.g. through a so-called target wheel, and calculating therefrom the corresponding engine speeds over a given sampling window. The sampling window may e.g. span over one or more combustion cycles of the engine.

In one embodiment, using the well-known 58-X target wheel, 15 equally spaced in angular domain time stamps per engine revolution may be selected as a choice securing moderate ECU processor throughput without compromising the quality of the algorithm's outcome. In other words, the suggested choice provides sufficient DFT algorithm's accuracy, and at the same time does not interfere with the synchronization gap, and secures reasonable ECU processor engagement. In this connection, the number of samples per revolutions can be selected between 12 and 20 for a so-called 58-X wheel.

For other types of target wheels, the number of samples per revolution may be selected on the same basis of a compromise between accuracy and processing time, and will depend on the number of teeth of the target wheel.

As mentioned above, the relevant index of the Fourier component to be used as fuel quality indicator in the present method is preferably based on the number of firing events within the sampling window. Accordingly, for 4-stroke engines, the relevant index may be defined as the product of the number of engine cylinders by the number of combustion cycles within the sampling window. For example, the 8th index magnitude for a sampling window spanning over two combustion cycles represents the "natural" frequency of 4-cylinder engine and can be used as fuel quality indicator. But for a one combustion cycle wide sampling window, the $4^{th}$ index would be of relevance. In a 6-cylinder engine, with a sampling window spanning over two combustion cycles, the 12th index would be used to characterize departure of "natural" frequency from normal in case of a substandard fuel.

In a preferred, practical embodiment, a single calibration run with the reference fuel is sufficient to define the normal engine behavior. The calibration thus permits determining the complex number of the relevant index with reference fuel, and hence the calibrated magnitude of this complex number. In practice, the ECU may store information about reference fuel, i.e. both the real and imaginary parts of the complex number as obtained by calibration with reference fuel, and possibly the corresponding calibrated magnitude. The reference fuel is preferably high-quality fuel (high cetane number) or standard European fuel.

The fuel quality assessment may thus be made by comparing the determined fuel quality indicator to a threshold, the threshold being based on a calibrated magnitude of a complex number of same index obtained with a reference fuel at substantially same engine speed/load. This permits to readily discriminate between reference (high quality) fuel and lower quality fuel, and thus attribute the fuel to the normal (high quality) or sub-fuel classes. As will however be understood by those skilled in the art, more intensive calibration efforts permit predefining several fuel classes (or levels) on the basis of calibrated magnitude values of the selected index, by operating the engine with various fuel qualities (various cetane numbers) at same engine speed/load point. In such case, the fuel quality assessment may thus be carried out in determining to which calibrated class the measured fuel quality indicator belongs.

As it has been understood, to be able to compare the present, magnitude-based, fuel quality indicator to a calibrated fuel indicator of same index, the sampling of the engine speed data must be carried out at substantially similar engine speed/load conditions to those used during calibration. It has been observed that most reliable results are obtained when the fuel quality diagnostic is performed when the engine is idling (low RPM, say between 650 and 1100 RPM—no load), or at low speed/load values (e.g. from 1100 to 2000 RPM and 100 to 400 kPa of IMEP).

Performing the method when the engine is idling allows detecting the fuel quality at every engine start-up. However, as it will be understood, it may be sufficient to perform the present method upon refuelling.

It will further be appreciated, according to another aspect of the invention, that the determined fuel quality indicator or, respectively, the resulting fuel class, may provide an enabling input in the Engine control unit for adapting certain engine operating parameters.

Accordingly, a method of operating an internal combustion engine is also proposed, wherein a fuel quality indicator is determined in accordance with the above method, and a decision on the opportunity of taking corrective measures is made depending on said fuel quality indicator.

In particular, the fuel quality indicator, respectively the fuel class, may be used as an input to the control loop for relevant fuel scheduling adjustment.

BRIEF DESCRIPTION OF THE DRAWINGS

The present invention will now be described, by way of example, with reference to the accompanying drawings, in which.

DETAILED DESCRIPTION OF AN EMBODIMENT OF THE INVENTION

Figure 1:
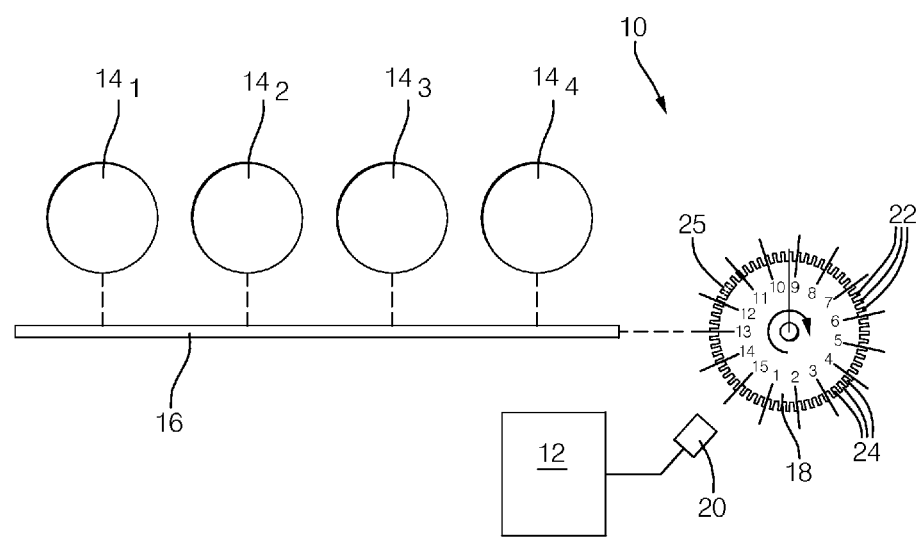
FIG. 1: is a principle drawing of an internal combustion engine equipped with a target wheel for engine speed determination.

Referring now to the drawings wherein like reference numerals are used to identify identical components, FIG. 1 shows an internal combustion engine 10, the operation of which is controlled by a programmed, electronic engine control unit (ECU) 12 or the like, as known generally in the art. As will be explained below, engine 10 is configured to provide improved discrimination capability of the fuel quality.

As schematically represented in FIG. 1, engine 10 includes a plurality of cylinders, illustrated in exemplary fashion as a 4-cylinder engine where the cylinders are designated $14_1$, $14_2$, $14_3$ and $14_4$. The basic arrangement of engine 10 is known in the art and will not be repeated exhaustively herein in detail. However, it should be understood that each cylinder $14_i$ is equipped with a corresponding piston (not shown), which is connected to a common crankshaft 16, as shown by the dashed-lines in FIG. 1. As known, the crankshaft 16 is coupled to a powertrain (e.g., transmission and other drivetrain components—not shown) in order to provide power to a vehicle (not shown) for movement. Controlled firing of the cylinders causes the various pistons to reciprocate in their respective cylinders, causing the crankshaft 16 to rotate. There is a known relationship between the angular position of the crankshaft 16, and each of the pistons. Each piston, as it reciprocates, moves through various positions in its cylinder, and any particular position is typically expressed as a crankshaft angle with respect to top-dead-center position. In the well-known 4-stroke engine (intake-compression-power-exhaust), two full revolutions (720 degrees) of the crankshaft 18 occur to complete one engine (combustion) cycle.

FIG. 1 further shows a target wheel 18 and a corresponding sensor 20. Target wheel 18 is rotationally coupled with the crankshaft 16. Target wheel 18 includes a plurality of radially-outwardly projecting teeth 22 separated by intervening slots 24. Target wheel 18 further has a so-called synchronization gap: a gap 25 where teeth are missing and thus no transitions are generated. Target wheel 18 and sensor 20 are, in combination, configured to provide an output signal 26 that is indicative of the angular position of crankshaft 26. Output signal 26 may be used to derive a speed indicative signal. Such wheel is conventional as well as the way the engine speed signal can be obtained therefrom, and will therefore not be further explained.

The ECU 12 is configured generally to receive a plurality of input signals representing various operating parameters associated with engine 10. ECU 12 is further typically configured with various control strategies for producing needed output signals, such as fuel delivery control signals (for fuel injectors—not shown) all in order to control the combustion events.

The ECU 12 is further configured to be able to detect the fuel quality in accordance with the present method, a preferred embodiment of which will now be described hereinbelow, where the spectral content of a crankshaft-originated speed signal is analyzed using Fourier transformation, namely DFT.

As mentioned above, the present inventors have observed that engine instability induced by substandard fuel, preferably at a constant low engine speed, correlates very well with a specific magnitude index of DFT representing natural frequency of the engine (or harmonics thereof), defined by number of firings per engine combustion cycle.

Figure 2:
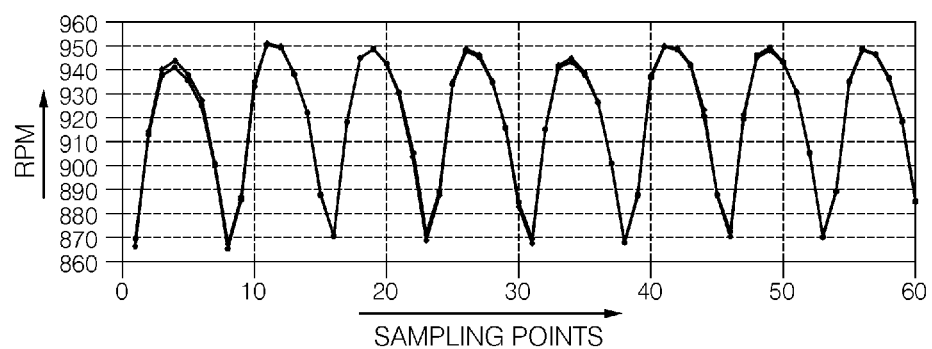
FIG. 2: is a graph illustrating the sampled engine speed over two combustion cycles.

FIG. 2 shows an example of an engine crankshaft speed as recorded on a 4-cylinder engine. The graph of FIG. 2 has been obtained by sampling the engine speed signal, as derived from sensor 20, at predetermined intervals over two combustion cycles of the engine. Those skilled in the art will recognize a classical sine wave signature corresponding to normal engine operation. The combustion peak pressure location typically occurs in the vicinity of the minimums of the sine wave-like angular velocity fluctuations. In such 4-cylinder engine, the first four peaks are generated by the typical firing scheme of cylinders 1, 3, 4 and 2.

The ECU generally employs Digital Fourier Transformation (DFT) technique to evaluate the spectral content of the crankshaft-originated speed signal. Application of the DFT facilitates the production-feasible calculation of a single magnitude index indicative either of operation with normal or low quality fuel.

The present method processes an array of speed data acquired during a given time window. In practice, an array of timestamp information is produced, corresponding to the measured, angular positions of the crankshaft generated by way of information produced by target wheel 18 and sensor 20 during rotation. The speed data is then determined from this information, as is known in the art.

The speed data is then converted in the frequency domain, where a preselected index complex number is of interest. More specifically, the magnitude of the complex number of a given index is used as a metric of the fuel quality.

Figure 3:
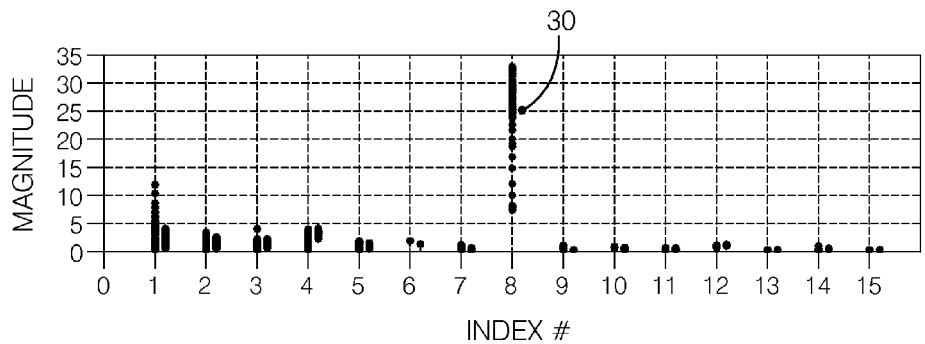
FIG. 3: is a graph of the magnitude of several indices in the frequency domain engine speed.

Turning now to FIG. 3, the complex magnitude of several indices (1 to 15) for sampling window stretching, in the presented example, over two combustion cycles has been represented for a 4-cylinder engine, calculated for a series of speed data acquired at various engine speed/load points. As can be seen, the $8^{th}$ index magnitude appears to be the most sensitive and corresponds to the natural frequency of the engine.

The dot indicated 30 represents the magnitude of the $8^{th}$ index, obtained in a narrow engine speed range near idle, for two combustion cycles.

As can be seen, under given engine operating conditions and with a normal fuel, the DFT-response formed by the magnitude of the $8^{th}$ index is precise. This $8^{th}$ index magnitude can be used as a metric of fuel quality for a 4-cylinder engine, as will be shown below.

In practice, this $8^{th}$ index magnitude can be calculated as follows.

The DFT from the time domain where the signal of interest (here the engine speed RPM), represented by the collection of samples within the selected sampling window), can by expressed, in a normalized form, by equations (1) and (2) that provide real (designated "Re") and imaginary portion (designated "Im") of the transformed signal X for index j.

$$\mathrm{Re}(XN(j)) = \left[ \sum_{i=0}^{N-1} RPM(i) \cdot \cos(2\pi i \cdot j/N) - real.cal.entry \right] \quad (1)$$

$$\mathrm{Im}(XN(j)) = \left[ \sum_{i=0}^{N-1} RPM(i) \cdot \sin(2\pi i \cdot j/N) - imag.cal.entry \right] \quad (2)$$

Where N is the number of samples in the collected array of engine speed data RPM; and real.cal.entry and imag.cal.entry are calibrated corresponding indices obtained with reference fuel (i.e. high cetane number fuel). Note that the equations (1) and (2) normalization results from subtracting calibrated indices from indices representing experiments with unknown fuel, and leads to subsequent near zero indices if unknown fuel performance, i.e. Cetane number, equals reference fuel performance.

The complex number represented by equations (1) and (2) may be equivalently represented by its magnitude and phase, through well-known relationships. As is known, the magnitude (amplitude) of a complex number is calculated as the square root of the sum of its squared real part and squared imaginary part.

Let us apply this to the example of FIG. 2, where the sampling rate is 15 samples per revolution and the sampling window corresponds to 2 combustion cycles, i.e. N=60. Furthermore, the $8^{th}$ index is the component that allows for fuel discrimination in a four-cylinder engine.

Equations (1) and (2) can hence be rewritten as:

$$\mathrm{Re}(XN(8)) = \left[ \sum_{i=0}^{59} RPM(i) \cdot \cos(16\pi i/60) - real.cal.entry \right] \quad (3)$$

$$\mathrm{Im}(XN(8)) = \left[ \sum_{i=0}^{59} RPM(i) \cdot \sin(16\pi i/60) - imag.cal.entry \right] \quad (4)$$

And the normalized magnitude is then simply determined as:

$$\mathrm{Magnitude}N = \sqrt{\{Re[XN(8)]\}^2 + \{Im[XN(8)]\}^2} \quad (5)$$

Figure 4:
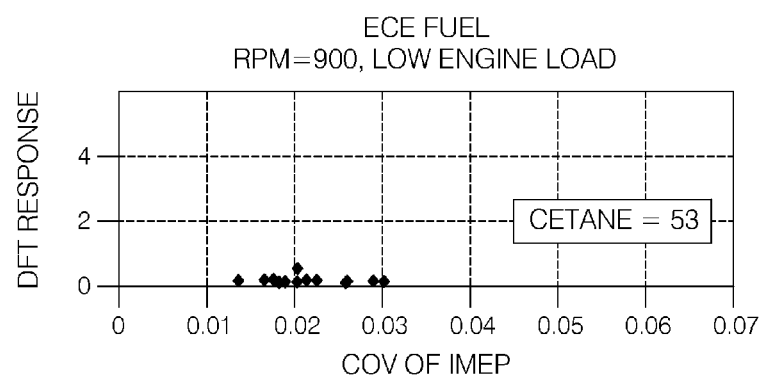
FIGS. 4 and 5: are graphs illustrating the DFT response vs. calculated sigma.
Figure 5:
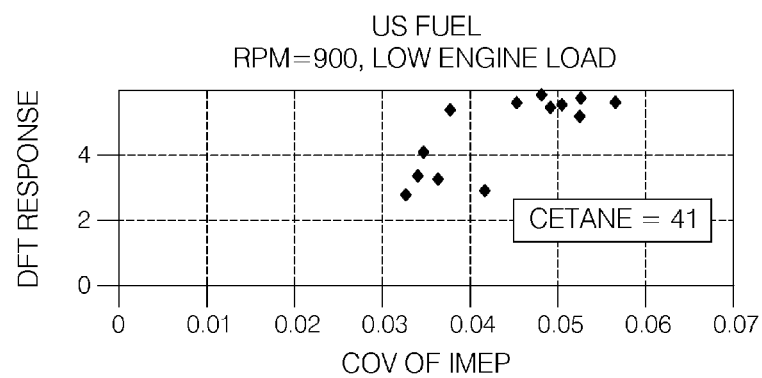

FIGS. 4 and 5 represent the performance of the present method, implemented with the equations (3) to (5). It may be noted that the output of the equations is in arbitrary units. The tests were carried out at idle (about 900 RPM), without load.

In the graph of FIG. 4 the vertical axis is the DFT response as represented by the normalized magnitude of the $8^{th}$ index. The horizontal axis corresponds to the so-called "calculated sigma", which represents normalized coefficient of variation (COV) of Indicated mean effective pressure (IMEP); these concepts of COV and IMEP are well known to those skilled in the art and need not be further explained herein. The control test results of the engine behavior in response to a reference fuel is depicted in FIG. 4 and has been carried out with standard ECE fuel, CN=53. The DFT response is stable and close to zero.

FIG. 5 shows the same type of graph, however for test carried out with a sub-quality fuel having a Cetane Number of 41 (representing worst case US-type fuel). As can be seen, the DFT response is noticeably affected by the variation of fuel quality.

As shown above, preferred embodiment of the invention uses a selected index of DFT-derived representation in the engine rotation frequency domain to instantly validate and/or measure the engine IMEP stability at every start of the engine. The windowing method defining the size of the array of the time markers used to calculate the specific index of the transformation is determined so as to minimize the number of steps necessary to calculate the desired index of the transformation.

The outcome of this action, the calculated magnitude of the complex number representing the index, becomes an indicator of fuel quality. It provides the knowledge of a change in the fuel performance, which may result when refuelling with diesel fuel with a different cetane number.

This method is based on the fact that any departure from a reference pre-defined cetane number affects the stability of engine rotation. Namely, the magnitude of the index representing the vibrational natural frequency defined by the number of combustion events per combustion cycle is practically invariant for idling engine (or engine running at constant speed) of the same type fuelled with a standard, base fuel, but changes with the quality of the fuel used for combustion.

This allows for one point engine calibration (e.g. at engine idling at low load), or a limited number of single engine speed/load points.

In other words, the magnitude of DFT indices is determined by the size of the sampling window and that the window size strictly correlates with the number of the combustion events within one combustion cycle.

It has been found that the relevant DFT index magnitude departs from its initial value representing engine operation with normal fuel and the difference between reference and instant index magnitude is a measure of increasing engine instability which may be measured as COV of IMEP (standard indicator of engine stability in the industry).

It should further be appreciated that the present method is simpler to implement and provides a more efficient fuel quality discrimination capability than known phase-based detection approach as described in DE 10 2008 010 107. Indeed, phase-based diagnostics of the engine torque misbalance becomes only fully reliable at the ultimate limit of a cylinder (or cylinders misfire). This is due to the fact that the calculated phase of any index of the transformation provides highly unreliable readings unless the phase itself becomes locked by the extreme engine misbalance, i.e., misfire. Consequently, phase-based engine misbalance detection regardless of the source of that misbalance would require a wide range engine calibrations and its reliability is usually questionable.

For low cetane fuel combustion conditions the locked phase response could be very small and may not be discriminated from normal engine combustion with high cetane fuel. It is known that variations covering the full range of cetane could result in only few engine degrees of combustion delay and such the resulting DFT phase shift would be very low as well.

TABLE 1

| Cetane Number | Phase | Magnitude |
| --- | --- | --- |
| 41 | 153.64 | 35.53 |
| 54 | 154.13 | 40.13 |
| RATIO | 1.003 | 1.13 |

Table 1 illustrates the magnitude and phase variation between a low cetane (41) fuel and a high cetane (54) fuel in specific operating points (idle/no load). The last line of table 1 is the ratio between the above values. As can be seen, the phase response hardly reaches a statistically reliable change, whereas the change in magnitude is more significant.

The present method may be implemented at every start of the engine, possibly in combination with the latest record of refueling, certifying the diagnostic and thus further increasing reliability of the algorithm.

The proposed method is really adapted for mass production application, i.e., it is a practical Cetane number detection algorithm. The information on Cetane number is extracted by processing solely the "natural engine frequency", i.e. only one single index of the DFT transformation (defined by number of cylinders), and the Cetane number indicator can be obtained using a brief idling period or any other low speed steady state condition on every start of the engine. As mentioned above, the departure from the reference fuel can be reliably detected by means of a single calibration point at an appropriately selected engine operating point (say e.g. at idle). In practice one may use one of a limited number of calibration points (e.g. for cross-checking at higher RPM), but a full mapping is not required.

The following aspects of the present method may further be noted:

A single calibration run with the reference fuel is sufficient to define the normal engine behavior. In other words, it has been recognized that sensing deviation from reference fuel provides more insight into the current engine behavior than do any calculations of absolute variations (e.g., as expressed in the unaltered inherent amplitude of the relevant transformation index)

Constant but single engine speed/load with a pre-defined calibration tolerance may typically be employed for both engine calibration and in-service fuel diagnostics.

Since it is desirable to diagnose the fuel quality as quickly as possible after the start of the engine, the present method is preferably performed at an engine speed close to the idle. This makes it easy to perform the test at every engine start. The coherence of the results may however be verified by conducting the test again at a selected higher engine speed (or speeds).

8th index magnitude for sampling window spanning over two combustion cycles represents "natural" frequency of 4-cyl engine. 6-cyl engine would require same sampling window, same number of samples but 12th index would be calculated to characterize departure of "natural" frequency from normal in case of a substandard fuel. In short, the DFT transformation procedure is always limited to one index of the DFT transformation. The index selection is based on number of firing events within one sampling window and the width of the sampling window is preferably two combustion cycles. However one combustion cycle may also be used, but statistically provides fewer guarantees for error free diagnostics. On the other hand, increasing the sampling window to three or more combustion cycles increases statistical separation between results representing reference fuel and sub-quality fuel, but at the same time extends the time period needed to reach the conclusion. Those skilled in the art will thus select an appropriate size of sampling window based on the specifics of each case; the above embodiments with a sampling size of two combustion cycles are given for the sake of exemplification and not to be construed as limiting.

The invention claimed is:

1. A method of determining fuel quality in an internal combustion engine comprising the steps of:
   a) sampling a signal representative of the revolution speed of said engine during a sampling window, thereby obtaining an array of samples;
   b) computing a Fourier component corresponding to a predetermined index in the frequency domain and determining a fuel quality indicator therefrom; and
   c) deciding on the opportunity of taking corrective measures based on said fuel quality indicator;
   wherein said fuel quality indicator is representative of a magnitude of said Fourier component of said predetermined index.

2. The method according to claim 1, wherein the selection of said predetermined index is based on the number of firing events within the sampling window.

3. The method according to claim 2, wherein said predetermined index is defined as the number of firing events per combustion cycle multiplied by the number of combustion cycles in the sampling window.

4. The method according to claim 1, wherein a set of 12 to 20 samples per engine revolution is taken.

5. The method according to claim 4, wherein a set of 15 samples per engine revolution is taken.

6. The method according to claim 1, wherein said engine comprises four cylinders, said sampling window extends over two combustion cycles and said predetermined index is the $8^{th}$ index.

7. The method according to claim 1, wherein said engine comprises six cylinders, said sampling window extends over two combustion cycles and said predetermined index is the $12^{th}$ index.

8. The method according to claim 1, wherein said method is performed under predetermined engine speed/load conditions.

9. The method according to claim 8, wherein said method is performed when the engine is idling.

10. The method according to claim 1, wherein at least two of said arrays of samples are determined at different engine speed/load conditions, and the respective fuel quality indicators representative of the magnitudes of the Fourier component from said at least two arrays are determined, and a change of fuel quality is taken into account only if the determined fuel quality indicators converge.

11. The method according to claim 1, comprising comparing said fuel quality indicator to a calibrated threshold, which is based on a calibrated magnitude of a complex number of same index obtained with a reference fuel at substantially same engine speed/load.

12. The method according to claim 11 wherein comparison to a single calibration point or threshold, or to a limited number of calibration points or thresholds, is sufficient to detect a change of fuel quality.

13. The method according to claim 1, comprising the further step of attributing the fuel quality indicator to one of at least two fuel classes.

14. The method according to claim 1, wherein said fuel quality indicator is a mean value of fuel quality indicators each representative of a magnitude of said Fourier component of said predetermined index under substantially same engine operating conditions.

15. The method according to claim 1, wherein no corrective measures are taken if a detected variation of said fuel quality indicator does not follow a refueling event.

16. The method according to claim 1, wherein the taking of corrective measures involves adapting engine operating parameters.

\* \* \* \* \*